United States Patent
Mizutani et al.

(10) Patent No.: US 9,232,086 B2
(45) Date of Patent: Jan. 5, 2016

(54) INFORMATION PROCESSING APPARATUS, INFORMATION PROCESSING SYSTEM, AND INFORMATION PROCESSING METHOD FOR DISPLAYING USER INFORMATION WHEN USER AUTHORIZATION IS NOT KNOWN

(71) Applicant: FUJI XEROX CO., LTD., Tokyo (JP)

(72) Inventors: Ryota Mizutani, Minamiashigara (JP); Minoru Koshimizu, Yokohama (JP); Masatsugu Hama, Yokohama (JP); Kazuhiro Mino, Tokyo (JP); Kenji Kojima, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/044,365

(22) Filed: Oct. 2, 2013

(65) Prior Publication Data

US 2014/0104637 A1    Apr. 17, 2014

(30) Foreign Application Priority Data

Oct. 12, 2012   (JP) .................................. 2012-227213

(51) Int. Cl.

| | |
|---|---|
| *G06K 15/00* | (2006.01) |
| *H04N 1/00* | (2006.01) |
| *H04N 1/32* | (2006.01) |
| *H04N 1/44* | (2006.01) |
| *G06F 3/147* | (2006.01) |
| *G06F 21/84* | (2013.01) |

(Continued)

(52) U.S. Cl.

CPC ......... *H04N 1/00129* (2013.01); *H04N 1/0048* (2013.01); *H04N 1/00854* (2013.01); *H04N 1/00859* (2013.01); *H04N 1/32117* (2013.01); *H04N 1/4413* (2013.01); *B41J 3/4076* (2013.01); *G06F 3/147* (2013.01); *G06F 17/30011* (2013.01); *G06F 21/84* (2013.01); *G06K 9/00013* (2013.01); *H04N 1/0035* (2013.01); *H04N 2201/3205* (2013.01); *H04N 2201/3273* (2013.01)

(58) Field of Classification Search
None
See application file for complete search history.

(56) References Cited

U.S. PATENT DOCUMENTS

| | | | | |
|---|---|---|---|---|
| 2003/0090502 | A1* | 5/2003 | Yuasa et al. | .................... 345/700 |
| 2007/0103715 | A1* | 5/2007 | Nakata | ......................... 358/1.14 |

(Continued)

FOREIGN PATENT DOCUMENTS

| | | |
|---|---|---|
| JP | 2008147982 A | 6/2008 |
| JP | 2008149492 A | 7/2008 |

(Continued)

*Primary Examiner* — Miya J Cato
(74) *Attorney, Agent, or Firm* — Sughrue Mion, PLLC

(57) ABSTRACT

There is provided an information processing apparatus. A reception unit receives user identification information for identifying a user of the information processing apparatus which outputs display information to a display device which displays the display information, and the display information which is output to the display device. A transmission unit, in a case where it is authorized that the user is permitted to use the information processing apparatus based on an authorized result of the user identification information received by the reception unit, transmits the user identification information and the display information to the display device when it is unclear whether or not the user is authorized to output the display information received by the reception unit to the display device and a predetermined condition about the user for outputting the display information to the display device is satisfied.

5 Claims, 10 Drawing Sheets

(51) Int. Cl.
  *G06F 17/30* (2006.01)
  *G06K 9/00* (2006.01)
  *B41J 3/407* (2006.01)

(56) References Cited

U.S. PATENT DOCUMENTS

2008/0137122 A1* 6/2008 Eguchi et al. ................ 358/1.13
2009/0278657 A1  11/2009 Kawashima et al.
2010/0002250 A1* 1/2010 Sakagami et al. ........... 358/1.14
2011/0069347 A1* 3/2011 Kawabuchi et al. ......... 358/1.15
2012/0167191 A1* 6/2012 Lauper .............................. 726/7
2013/0242334 A1* 9/2013 Ichida ........................... 358/1.14

FOREIGN PATENT DOCUMENTS

JP  2009271841 A  11/2009
JP  2011198045 A  10/2011

* cited by examiner

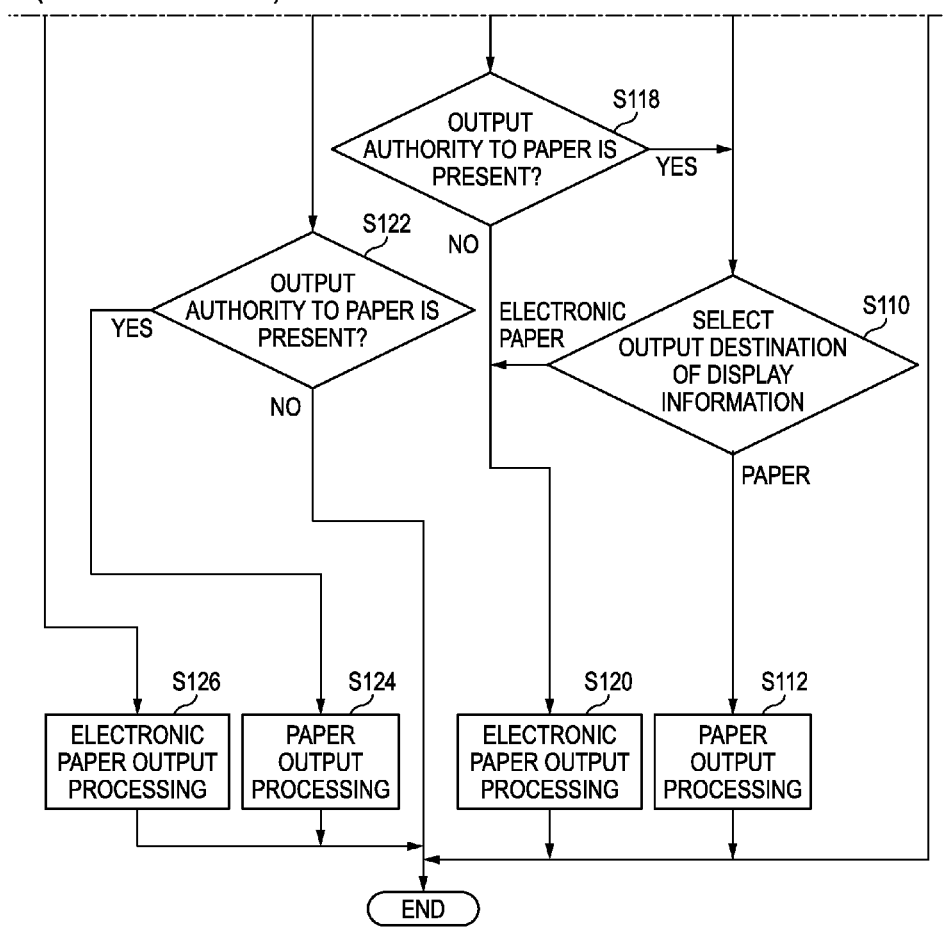

FIG. 9

FILE OUTPUT AUTHORITY TABLE

| FILE NAME | PAPER | | ELECTRONIC PAPER | |
|---|---|---|---|---|
| | PERMIT | INHIBIT | PERMIT | INHIBIT |
| FILE 1 | ID1, ID3 | ID2 | ID1, ID3 | ID2 |
| FILE 2 | ID3 | ID2 | ID1 | ID2 |
| FILE 3 | ID3 | ID2 | ID3 | ID2 |
| FILE 4 | ID1 | ID2 | ID3 | ID2 |
| ... | ... | ... | ... | ... |

FILE ATTRIBUTE TABLE

| FILE NAME | DRAFTER ID | FILE DRAFT DATE & TIME |
|---|---|---|
| FILE 1 | ID1 | yyyy/mm/dd hh:mm:ss |
| FILE 2 | ID3 | yyyy/mm/dd hh:mm:ss |
| FILE 3 | ID3 | yyyy/mm/dd hh:mm:ss |
| FILE 4 | ID1 | yyyy/mm/dd hh:mm:ss |
| ... | ... | ... |

ORGANIZATION INFORMATION TABLE

| STAFF ID | GROUP BELONGED | BOSS ID |
|---|---|---|
| ID1 | GROUP1 | ID3, ID4 |
| ID2 | GROUP2 | ID5 |
| ID3 | GROUP1 | ID4 |
| ... | ... | ... |

84

INFORMATION PROCESSING APPARATUS, INFORMATION PROCESSING SYSTEM, AND INFORMATION PROCESSING METHOD FOR DISPLAYING USER INFORMATION WHEN USER AUTHORIZATION IS NOT KNOWN

CROSS-REFERENCE TO RELATED APPLICATIONS

This application is based on and claims priority under 35 U.S.C. §119 from Japanese Patent Application No. 2012-227213 filed on Oct. 12, 2012.

TECHNICAL FIELD

The present invention relates to an information processing apparatus, an information processing system, and an information processing method.

SUMMARY

According to an aspect of the exemplary embodiments of the present invention, there is provided an information processing apparatus, including: a reception unit that receives user identification information for identifying a user of the information processing apparatus which outputs display information to a display device which displays the display information, and the display information which is output to the display device; and a transmission unit that, in a case where it is authorized that the user is permitted to use the information processing apparatus based on an authorized result of the user identification information received by the reception unit, transmits the user identification information and the display information to the display device when it is unclear whether or not the user is authorized to output the display information received by the reception unit to the display device and a predetermined condition about the user for outputting the display information to the display device is satisfied.

BRIEF DESCRIPTION OF THE DRAWINGS

Exemplary embodiments of the present invention will be described in detailed based on the following figures, wherein:

FIG. 9 is a diagram for describing an output authority set in display information according to the present exemplary embodiment;

FIG. 10 is a diagram for describing an attribute of display information according to the present exemplary embodiment;

FIG. 11 is a diagram for describing organization information according to the present exemplary embodiment.

DETAILED DESCRIPTION

Figure 1:
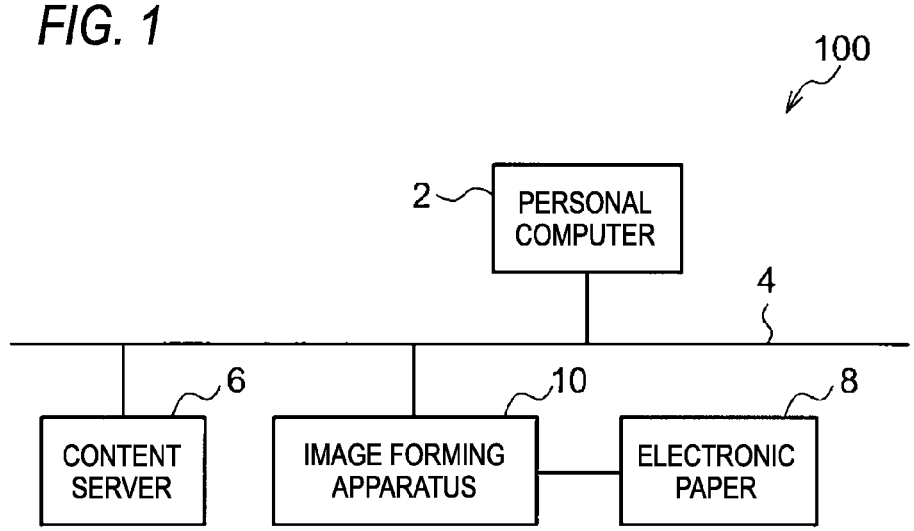
FIG. 1 is a schematic configuration diagram of an information processing system.

Hereinafter, exemplary embodiments of the present invention will be described in detail with reference to the accompanying drawings. Further, components which are in charge of the same actions and functions are denoted by the same reference numerals throughout the overall drawings and the repeated descriptions thereof may be omitted.

FIG. 1 is a schematic configuration diagram of an information processing system 100 according to an exemplary embodiment of the present invention. As illustrated in FIG. 1, the information processing system 100 is configured so that a personal computer (hereinafter, referred to as a PC) 2, a content server 6, and an image forming apparatus 10 as an information processing apparatus are connected each other via a network 4 and the image forming apparatus 10 is connected to electronic paper 8 as a display device. In this configuration, the image forming apparatus 10 refers to an apparatus having a plurality of functions, such as a printer function, a copy function, a scanner function, and a facsimile function.

The image forming apparatus 10 receives, from the PC 2, for example, information displayed on the electronic paper 8, content selection information which selects information (display information) recorded on a recording medium such as paper by using a printer function included in the image forming apparatus 10, and user identification information which identifies a user who wishes to output the display information to the electronic paper 8 or the recording medium, and the like, by using the image forming apparatus 10. Further, the image forming apparatus acquires the display information displayed as the content selection information from the content server 6 and then outputs the display information to the electronic paper 8 or the recording medium based on the display information output processing to be described below.

The network 4 may be wired or wireless and similarly, the electronic paper 8 and the image forming apparatus 10 may be connected to each other in a wired or wireless manner. Further, although the electronic paper 8 according to the exemplary embodiment of the present invention is directly connected to the image forming apparatus 10, the electronic paper 8 may include an interface (I/F) connected to the network 4 and the image forming apparatus 10 and the electronic paper 8 may be connected through the network 4.

The content server 6 is configured by, for example, a network connection storage, a personal computer and stores display information in a data storage medium such as a hard disk.

Figure 2:
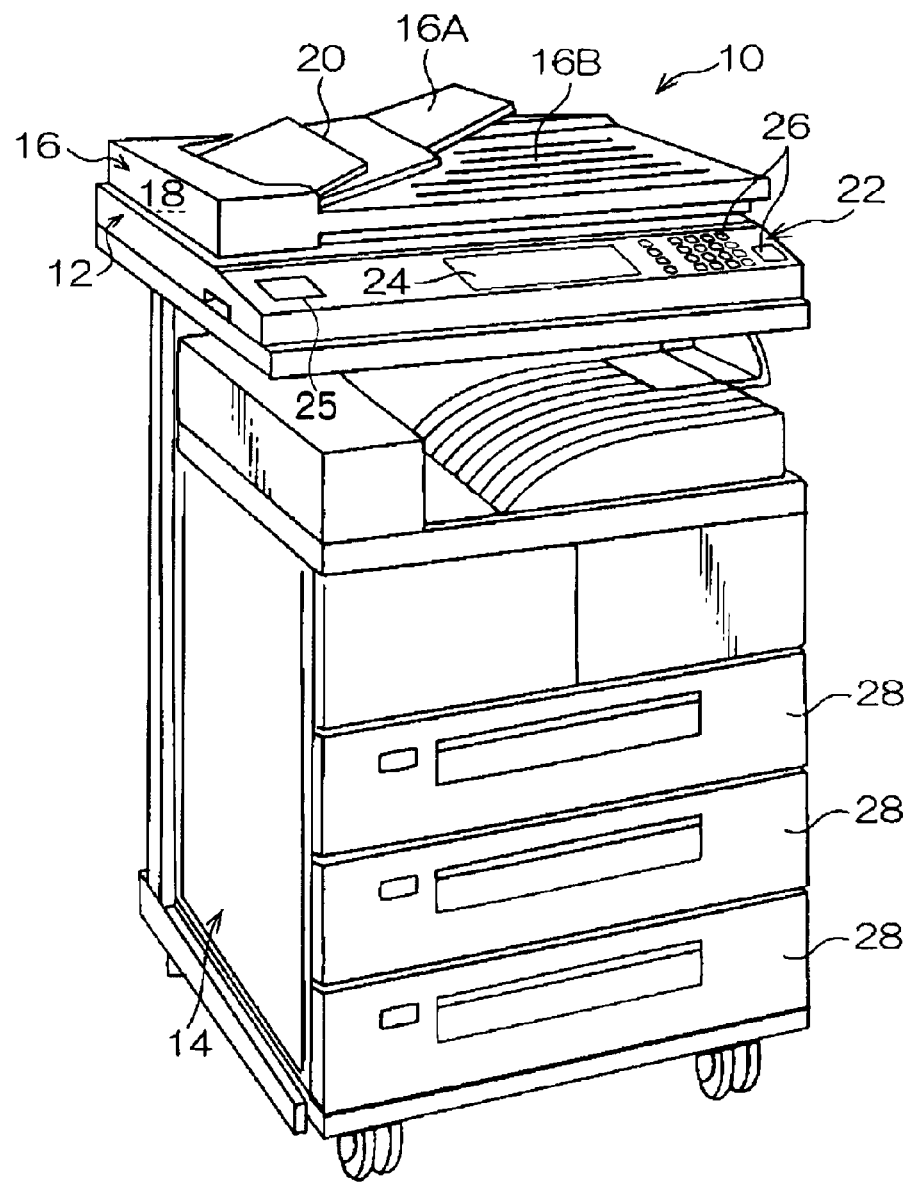
FIG. 2 is a perspective view of main components of an image forming apparatus.

FIG. 2 illustrates a perspective view of main components of the image forming apparatus 10 according to the embodiment of the present invention.

In the image forming apparatus 10, an image reading unit 12 is provided at an upper portion of the image forming apparatus 10 and an image forming unit 14 is disposed under the image reading unit 12. In the image reading unit 12, a manuscript conveyance unit 18 is included in a manuscript cover 16. The manuscript conveyance unit 18 sequentially draws in manuscripts 20 loaded on a manuscript feeding unit 16A provided on the manuscript cover 16 and conveys the manuscripts 20 onto a platen glass (not illustrated). The image reading unit 12 reads image information recorded in the manuscripts 20 conveyed onto the platen glass. Further, the manuscript conveyance unit 18 discharges the manuscripts 20 for which the image reading have been finished, onto a manuscript discharge unit 16b which is provided on the manuscript cover 16.

The image reading unit 12 is provided with an operation display unit 22 which receives various instruction operations of a user and displays various kinds of information of the image forming apparatus 10. The operation display unit 22 includes, for example, a touch panel type display 24 on which displayed buttons which executes the reception of instruction operations by a software program or various kinds of information are displayed, hardware keys 26 such as ten keys or a start button, and a card reader 25 that reads user identification information which is recorded in, for example, an IC card (not illustrated) such as a staff identity card, so as to authorize whether a user is permitted to use the image forming apparatus 10, prior to using the image forming apparatus 10. Further, when the user identification information is received from the PC 2 prior to using the image forming apparatus, it is not necessary to read the user identification information with the card reader 22 of the operation display unit 22.

Meanwhile, the image forming unit 14 forms an image on a recording medium accommodated in a paper accommodation unit 28 by, for example, a so-called electrophotographic method.

Specifically, the image forming unit 14 is configured to include, for example, a charging device that charges a photoconductor drum, an exposure device that forms an electrostatic latent image according to the image on the photoconductor drum by exposing an upper portion of the charged photoconductor drum with light according to the image, a developing device the develops the electrostatic latent image formed on the photoconductor drum with a toner, a transfer device that transfers a toner image according to the image formed on the photoconductor drum to the recording medium, and a fixing device that fixes the toner image according to the image transferred to the recording medium.

As the exposure device, there are a light scanning device which is configured to include an optical system such as a semiconductor laser or a rotating polygon mirror, a collimator lens or a cylindrical lens, and an fθ lens, and an LED head which is configured of a plurality of LEDs, for example.

Figure 3:
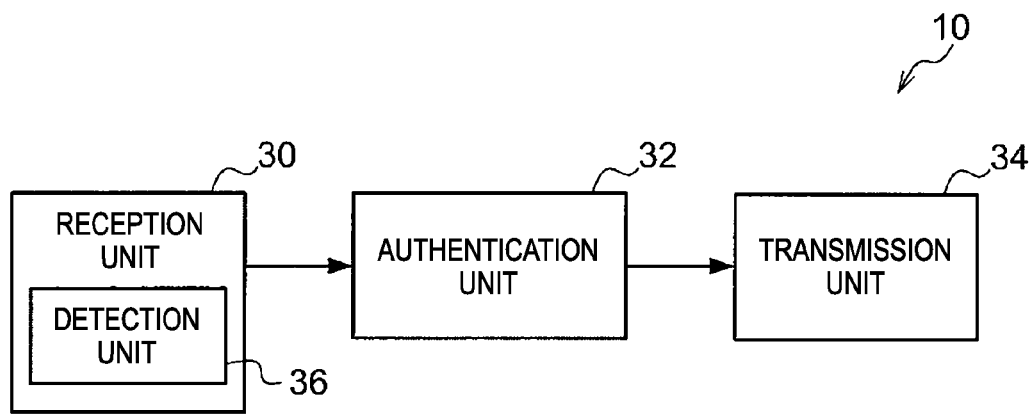
FIG. 3 is a block diagram illustrating a functional configuration of the image forming apparatus.

FIG. 3 is a functional block diagram illustrating a functional configuration of the image forming apparatus 10 according to the present exemplary embodiment. As illustrated in FIG. 3, the image forming apparatus 10 according to the exemplary embodiment of the present invention includes a reception unit 30, an authentication unit 32, and a transmission unit 34. Further, the reception unit 30 includes a detection unit 36.

The reception unit 30 receives the user identification information which identifies a user of the image forming apparatus 10 (hereinafter, simply referred to as a "user") and the content selection information which selects the display information stored in the content server 6. The reception unit 30 according to the exemplary embodiment of the present invention receives the user selection information and the content selection information from the PC 2 through the network 4. However, the detection unit 36, which detects the user identification information recorded in the recording medium such as the IC card which is not illustrated, may be provided in the image forming apparatus 10 such that the reception unit 30 may receive the user identification information from the detection unit 36 or receive the content selection information by the operation of the display buttons of the display 24 or the hardware keys 26.

The authentication unit 32 authenticates whether the user represented by the user identification information received by the reception unit 30 is a person permitted to use the image forming apparatus 10.

In the following description, the user who is permitted to use the image forming apparatus 10 is referred to as an "authenticated user" and the user who is not permitted to use the image forming apparatus 10 is referred to as an "unauthenticated user."

In a case in which the user represented by the user identification information received by the reception unit 30 is authenticated as a person permitted to use the image forming apparatus 10 by the authentication unit 32, the transmission unit 34 transmits the display information selected as the user identification information and the content selection information to the electronic paper 8 when the user is authorized to output the display information to the electronic paper 8 or when a predetermined condition for the user to output the display information to the electronic paper 8 is satisfied even if it is unclear whether or not the user is authorized to output the display information to the electronic paper 8.

Figure 4:
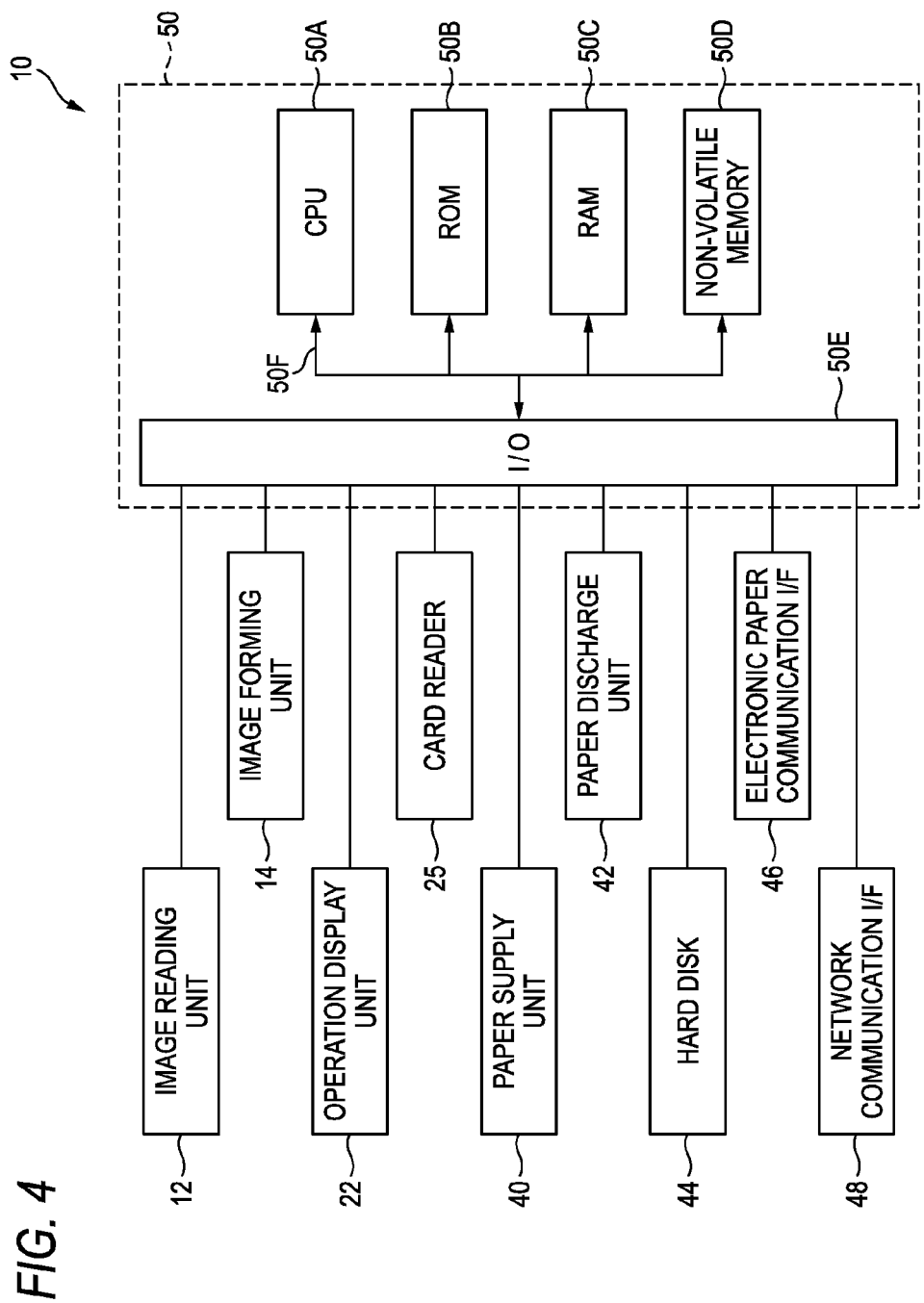
FIG. 4 is a block diagram illustrating a configuration of main components of an electric system of the image forming apparatus.

FIG. 4 is a block diagram illustrating a configuration of main components of an electric system of the image forming apparatus 10 according to the present exemplary embodiment. As illustrated in FIG. 4, the image forming apparatus 10 is configured to include a computer 50.

The computer 50 is configured by a central processing unit (CPU) 50A, a read only memory (ROM) 50B, a random access memory (RAM) 50C, a non-volatile memory 50D, and an input and output interface (I/O) 50E which are connected to each other via a bus 50F.

The I/O 50E is connected to the image reading unit 12, the image forming unit 14, the operation display unit 22, the card reader 25, a paper supply unit 40, a paper discharge unit 42, a hard disk 44, an electronic paper communication I/F 46, and a network communication I/F 48, for example.

The card reader 25 reads the user identification information which is recorded in an IC card (not illustrated) such as a staff identification card. The card reader 25 may be a contactless type or a contact type. Further, although the exemplary embodiment of the present invention describes a case in which the user identification information is recorded in the contactless type IC card (not illustrated), the user identification information may be recorded in a portable terminal such as a smart phone or a tablet terminal. In this case, the card reader 25 may be replaced with a portable terminal apparatus communication I/F and may read the user identification information recorded in the portable terminal by a wired or wireless manner.

The paper supply unit 40 is configured to include, for example, the paper accommodation unit 28 in which recording paper (paper), for example, a recording medium, is accommodated or a supply mechanism which supplies paper from the paper accommodation unit 28 to the image forming unit 14.

The paper discharge unit 42 is configured to include a discharge unit through which paper is discharged, a discharge mechanism which discharges paper on which an image is formed by the image forming unit 14 outside, for example, the image forming apparatus 10.

The hard disk 44 stores, for example, various control programs which control, for example, an operation of the image forming apparatus 10.

The electronic paper communication I/F 46 is an interface which performs data communication with the electronic paper 8 in a wired or wireless manner.

The network communication I/F 48 is an interface which performs data communication with the PC 2 and the content server 6 via the network 4.

As an example in the present exemplary embodiment, the control program which processes the display information output to be described below is executed by storing in the hard disk 44 in advance and reading the control program stored in advance by the CPU 50A. Further, a type in which the control program is recorded in a storage medium, such as CD-ROM and executed by being read by a CD-ROM drive, a type in which the control program is executed by being received through a wired or wireless communication device, or the like, may be used.

Figure 5:
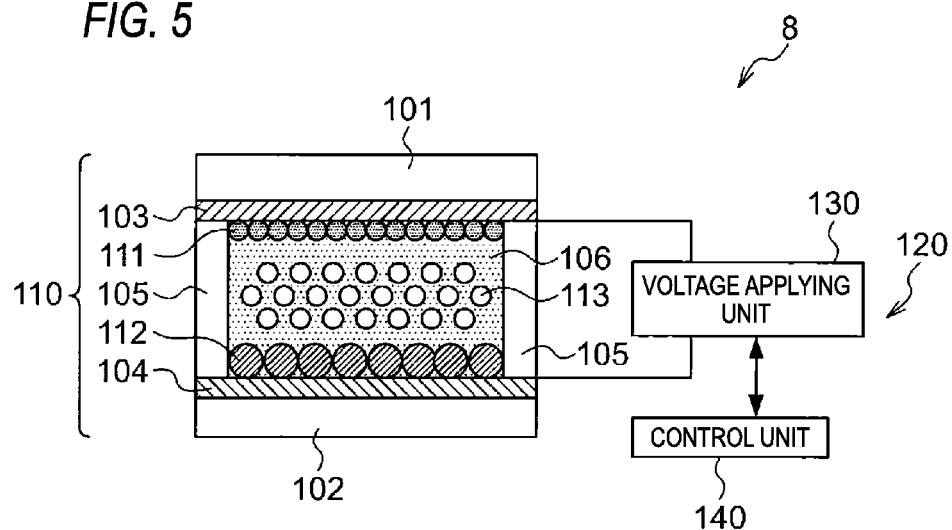
FIG. 5 is a schematic configuration diagram of an electronic paper apparatus.

Next, FIG. 5 is a schematic configuration diagram of the electronic paper 8 according to an exemplary embodiment of the present invention.

The electronic paper 8 includes an image display medium 110 and a driving device 120 which drives the image display medium 110. The driving device 120 is configured to include a voltage applying unit 130 which applies a voltage between a display side electrode 103 and a rear side electrode 104 of the image display medium 110 and a control unit 140 which controls the voltage applying unit 130 according to the display information received from the image forming apparatus 10 and displayed on the image display medium 110.

In the image display medium 110, a display substrate 101 which becomes an image display surface and is light-transmissive and a rear substrate 102 which becomes a non-display surface are disposed to face each other with a gap being interposed therebetween.

The image display medium 110 is provided with gap members 105 which partition the substrates 101 and 102 into a plurality of cells while maintaining the gap between the substrates 101 and 102 at a predetermined spacing.

The cells refer to regions which are enclosed by the rear substrate 102 provided with the rear side electrode 104, the display substrate 101 provided with the display side electrode 103, and the gap members 105. A dispersion medium 106 which is made up of, for example, an insulating liquid, and a first particle group 111, a second particle group 112, and a floating particle group 113 which are dispersed in the dispersion medium 106 are enclosed in the cells.

The first particle group 111 and the second particle group 112 are, for example, particle groups which are colored with different colors and charged with the same polarity, and have characteristics that, when a voltage not lower than a predetermined threshold voltage is applied between one pair of the electrodes 103 and 104, each of the first particle group 111 and the second particle group 112 is electrophoresed individually in the dispersion medium 106 and attached to the display substrate 101 or the rear substrate 102.

Meanwhile, the floating particle group 113 is a particle group which has a color different from those of, for example, the first particle group 111 and the second particle group 112 and is not charged, and floats in the dispersion medium 106 without being electrophoresed even when a voltage is applied between the pair of electrodes 103 and 104.

The driving device 120 (the voltage applying unit 130 and the control unit 140) electrophoreses the particle groups 111 and 112 in any one direction of the display substrate 101 and the rear substrate 102 according to the respective charging characteristics of the particle groups 111 and 112 by applying a voltage according a color to be displayed between the display side electrode 103 and the rear side electrode 104 of the image display medium 110.

The voltage applying unit 130 is electrically connected to each of the display side electrode 103 and the rear side electrode 105. Further, the voltage applying unit 130 is connected to the control unit 140 to exchange a signal therebetween.

The control unit 140 acquires a display color for each pixel from the display information received from the image forming apparatus 10 and controls the voltage applying unit 130 to apply a voltage according to the display color to each cell corresponding to each pixel.

Figure 6:
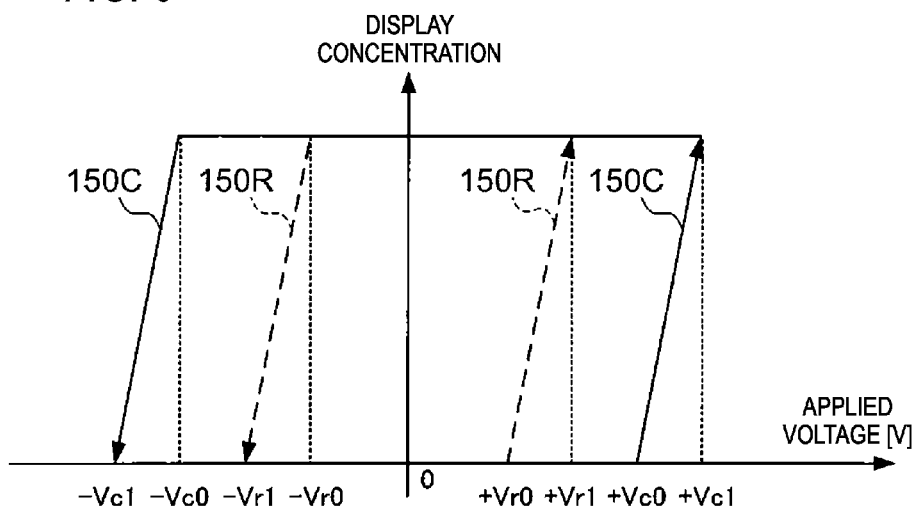
FIG. 6 is a diagram illustrating characteristics of a voltage applied to electrophoretic particles of the electronic paper apparatus.

FIG. 6 illustrates, for example, a characteristic of an applied voltage which is required to electrophorese positively charged electrophoretic particles (cyan particles C) as the first particle group 111, which have a cyan color and are light-transmissive, to the display substrate 101 side and the rear substrate 102 side (150C) and a characteristic of an applied voltage which is required to electrophorese positively charged electrophoretic particles (red particles R) as the second particle group 112, which have a red color and a particle diameter larger than that of the cyan particles C, to the display substrate 101 side and the rear substrate 102 side (150R), in the image display medium 110 according to the present exemplary embodiment.

As the floating particle group 113, for example, the floating particles (white particles W) which have a white color and are not light-transmissive are a non-charged particle group, and therefore, there are not electrophoresed in the dispersion medium 106 according to the applied voltage.

FIG. 6 illustrates the relationship between the voltage applied to the rear side electrode 104 and a display concentration by each particle group, in which the display side electrode 103 is set to be a ground level (0 V).

As illustrated in FIG. 6, an electrophoretic starting voltage to allow the cyan particles C at the rear substrate 102 side to start to be electrophoresed to the display substrate 101 side is $+Vc0$ and an electrophoretic starting voltage to allow the cyan particles C at the display substrate 101 side to start to be electrophoresed to the rear substrate 102 side is $-Vc0$. Therefore, for example, when a voltage not lower than $+Vc0$ is applied, the cyan particles C at the rear substrate 102 side are electrophoresed to the display substrate 101 side to be attached to the display substrate 101 side and when a voltage not higher than $-Vc0$ is applied, the cyan particles C at the display substrate 101 side are electrophoresed to the rear substrate 102 side to be attached to the rear substrate 102 side.

Further, the amount of cyan particles C at the rear substrate 102 side which are electrophoresed to the display substrate 101 side and the amount of cyan particles C at the display substrate 101 side which are electrophoresed to the rear substrate 102 side are controlled by changing the voltage value, and thus a gray display is controlled.

Similarly, the threshold voltage which starts to electrophorese the red particles R at the rear substrate 102 side to the display substrate 101 side is $+Vr0$ and the threshold value which starts to electrophorese the red particles R at the display substrate 101 side to the rear substrate 102 side is $-Vr0$.

Next, a control of the colors displayed on each cell will be described.

Even when a voltage of $-Vc1$ is applied to the rear side electrode 104 such that all the positively charged cyan particles C and red particles R are electrophoresed from the display substrate 101 side to the rear substrate 102 side so as to be attached to the whole surface at the rear substrate 102 side, and the white particles W float in the dispersion medium 106 without being electrophoresed. In this case, since the white particles W are not light-transmissive, the white particles W are observed by eyes at the display substrate 101 side and thus the white color is displayed.

In this state, when a voltage of +Vr1 is applied to the rear side electrode 104, the positively charged red particles R are electrophoresed from the rear substrate 102 side to the display substrate 101 side so as to be attached to the whole surface of the display substrate 101 side. In this case, the red particles R are observed by eyes at the display substrate 101 side and thus, the red color is displayed.

In the state of displaying the red color, when a voltage of +Vc1 is applied to the rear side electrode 104, the positively charged cyan particles C are electrophoresed from the rear substrate 102 side to the display substrate 101 side so as to be attached to the whole surface of the display substrate 101 side through the gap of the red particles R which are attached to the display substrate 101 side in advance. In this case, the black color which is a mixed color of the cyan color and the red color is displayed at the display substrate 101 side through the light-transmissive cyan particles C.

When a voltage of −Vr1 is applied to the rear side electrode 104 from the state of displaying the black color, the positively charged red particles R are electrophoresed from the display substrate 101 side to the rear substrate 102 side so as to be attached to the whole surface of the rear substrate 101 side. Since the cyan particles C remain attached to the whole surface of the display substrate 1 side, the cyan particles C are observed by eyes at the display substrate 101 side, and thus, the cyan color is displayed.

The display color displayed by the electronic paper as described above is an example and of course, the display color of the electronic paper 8 may be set by changing, for example, the characteristic of applied voltage, color, number, size, and a degree of light transmittance of each of the particle groups.

Figure 7:
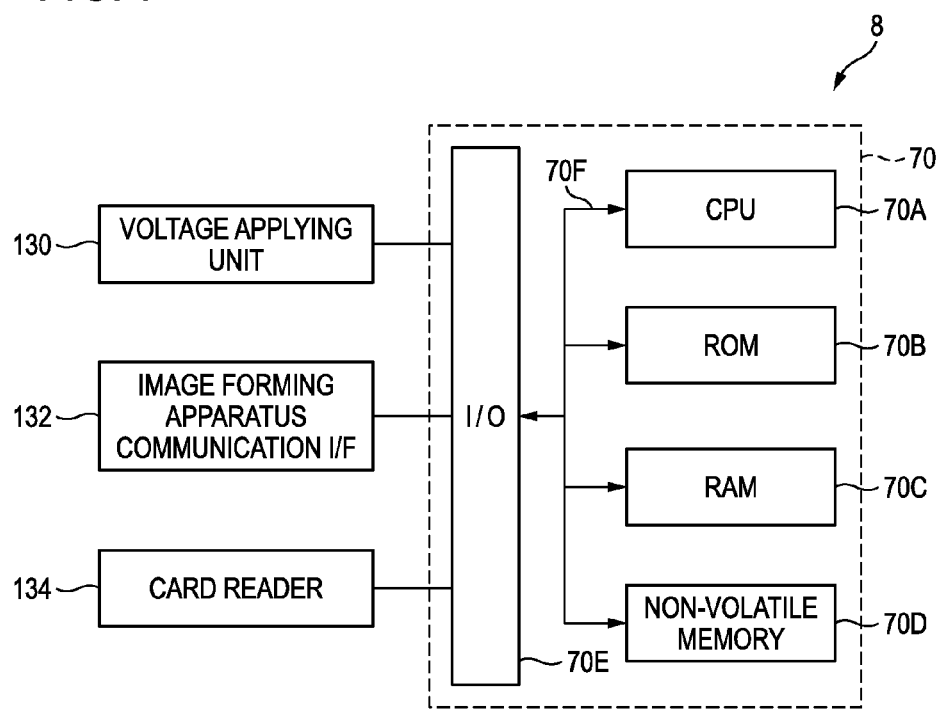
FIG. 7 is a block diagram illustrating a configuration of main components of an electric system of the electronic paper apparatus.

FIG. 7 is a block diagram illustrating a configuration of main components of an electric system of the electronic paper 8 according to the exemplary embodiment of the present invention. As illustrated in FIG. 7, the electronic paper 8 is configured to include a computer 70.

The computer 70 is configured so that a CPU 70A, a ROM 70B, a RAM 70C, a non-volatile memory 70D, and an I/O 70 are connected to each other via a bus 70F.

The I/O 70E is connected to a voltage applying unit 130, an image forming apparatus communication I/F 132, and a card reader 134, for example.

The image forming apparatus communication I/F 132 is an interface which performs data communication with the image forming apparatus 10 by a wired or wireless manner.

The card reader 134 reads reader identification information which is recorded in an IC card (not illustrated) such as, for example, a staff identification card. For convenience of description, the information read by the card reader 134 is referred to as the reader identification information and the information read by the card reader 25 of the image forming apparatus 10 is referred to the user identification information for the purpose of differentiation. However, it is assumed that the user identification information and the reader identification information refer to the same information.

The card reader 134 may be either a contactless type or a contact type. Further, although the present exemplary embodiment describes that the reader identification information is recorded in the contactless type IC card (not illustrated), the reader identification information may be recorded in a portable terminal, such as a smart phone or a tablet terminal. In this case, the card reader 134 may be replaced with a portable terminal device communication I/F and may be configured to read the reader identification information recorded in the portable terminal by a wired or wireless manner.

Next, the display information output processing which is executed by the computer 50 of the image forming apparatus 10 will be described with reference to a flow chart illustrated in FIG. 8.

Figure 8:
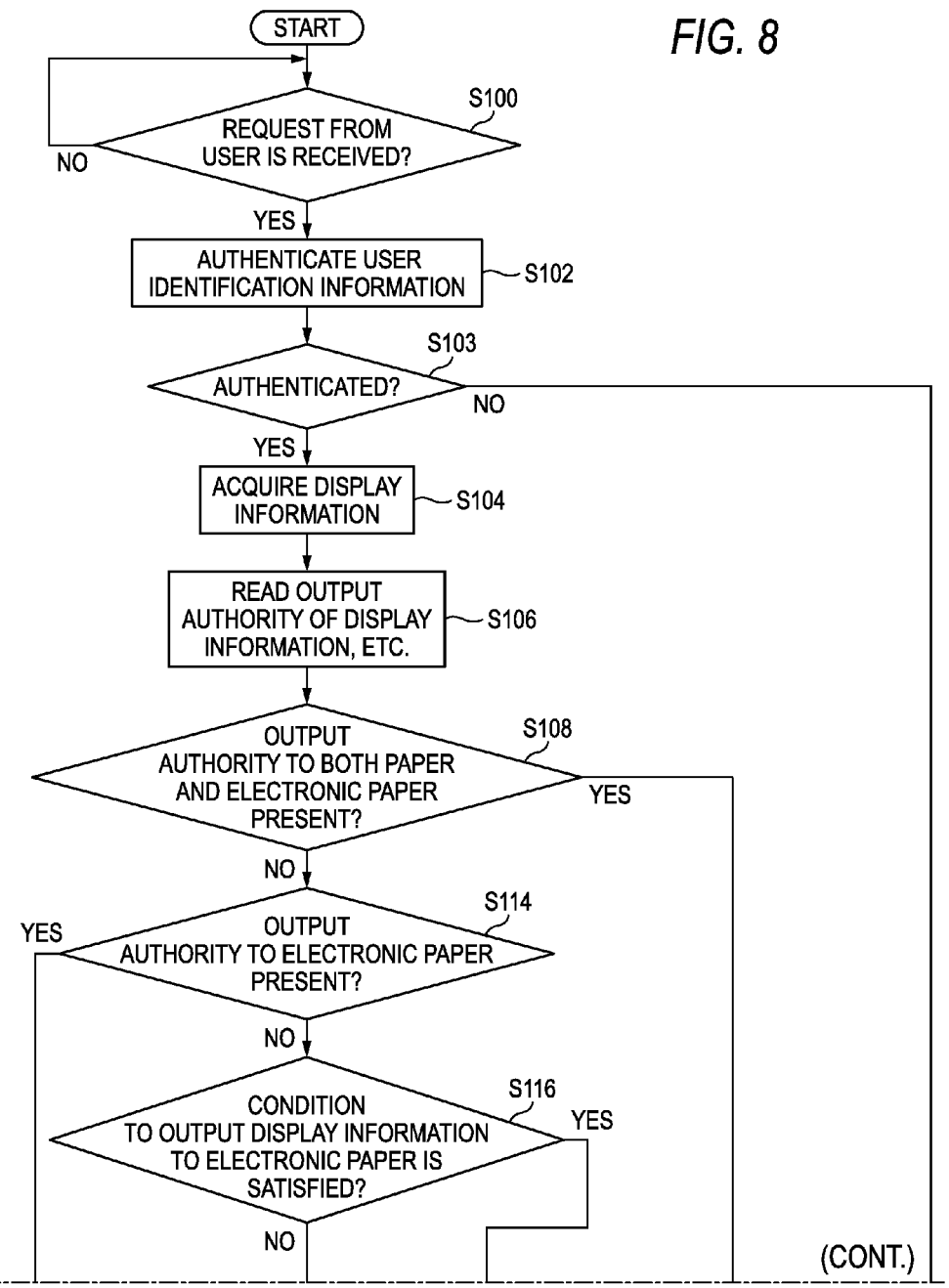
FIG. 8 is a flow chart of display information output processing executed by a computer of the image forming apparatus according to the present exemplary embodiment.

The processing illustrated in FIG. 8 is executed by, for example, the CPU 50A when the power of the image forming apparatus 10 is ON.

First, at step S100, it is determined whether the user identification information and the content selection information are received from the PC 2 through the network communication I/F 48 connected to the network 4. If the user identification information and the content selection information are not received, step S100 is executed until the user identification information and the content selection information are received. When the user identification information and the content selection information are received, for example, step S102 is followed while storing the user identification information and the content selection information in a predetermined region of the RAM 50C.

At step S102, it is authorized whether the user represented by the user identification information received in step S100 is an authenticated user or not. In this case, for example, the authorization may be performed by referring to an authenticated user table in which the user identification information of the authenticated user, which has been stored in the predetermined region of the nonvolatile memory 50D in advance, is described. Further, the authenticated user table may be stored in the content server 6 on the network 4 a server which is not illustrated, or the like, in advance. In this case, the PC 2 also transmits the user identification information to the content server 6 and the server which is not illustrated, in parallel to the processing of step S100. The content server 6 the server which are not illustrated), or the like, authenticates whether the user represented by the user identification information received from the PC 2 is an authenticated user or not by referring to the authenticated user table. Further, the authorized results are transmitted to the image forming apparatus 10 through the network 4. The image forming apparatus 10 may store the received authorized results in the RAM 50C and the authorization part 32 becomes needless.

The image forming apparatus 10 may acquire the authenticated user table from the content server 6 the server which are not illustrated, or the like through the network communication I/F 48, to be stored in the RAM 50C. In this case, the image forming apparatus 10 may authorize whether the user represented by the user identification information is an authenticated user or not by referring to the authenticated user table received from the content server 6, the server which is not illustrated, or the like.

At step S103, when the user identification information received in step S100 is not described in the authenticated user table, the user is authorized as a person who is not permitted to use the image forming apparatus 10, and the processing is finished. Meanwhile, when the user identification information received in step S100 is described in the authenticated user table, step S104 is followed.

At step S104, a file (a display information file) including the display information represented as the content selection information received in step S100 is acquired from the content server 6 through the network communication I/F 48 and is stored in a predetermined region of the RAM 50C.

At step S106, a file output authority table 80 illustrated in FIG. 9 and a file attribute table 82 illustrated in FIG. 10, which are stored in the content server 6, are acquired through the network communication I/F 48 and are stored in the predetermined region of the RAM 50C.

The file output authority table 80 is a table which defines an authority to output the display information included in each file to the recording medium, the display medium, and the like, and is updated each time when the display information file is registered in and deleted from the content server 6.

The file output authority table 80 according to the exemplary embodiment of the present invention includes an identification ID which specifies a person who is permitted or inhibited to print the display information on, for example, paper and an identification ID which specifies a person who is permitted or inhibited to output the display information to the electronic paper 8, for each display information file.

Specifically, in the file output authority table 80 of FIG. 9, a person represented by ID1 and ID3 is permitted to output the display information included in a file 1 to the paper and the electronic paper 8 and a person represented by ID2 is inhibited to output the display information included in the file 1 to the paper and the electronic paper 8. Further, it is not necessarily required to set the identification ID in a permission column and an inhibition column of the file output authority table 80 and the identification ID may not be set.

The file attribute table 82 is a table in which unique information for each display information file, for example, a drafter ID, a file writing date, or the like, specifying a drafter of the display information file, is recorded and additionally updated each time when the display information file is registered in the content server 6.

The file attribute table 82 of FIG. 10 according to the embodiment of the present invention has drafter IDs for each display information file set therein, and displays, for example, that the file 1 is written by a person represented by ID1.

The exemplary embodiment of the present invention describes that the display information file, the file output authority table 80, and the file attribute table 82 are configured as a separate file, but is not limited thereto. For example, the authority information ID to output the display information to the recording medium, the display medium, and the like, and the drafter ID, and the like may be allowed to be added to a region such as a header of the display information file. In this case, since the authority information to output the display information to the recording medium, the display medium, and the like, and the unique information in the display information file are acquired by the acquisition of the display information file in step S104, the processing of step S106 becomes needless.

The file output authority table 80 and the file attribute table 82 is not required to be stored in the content server 6 and may be stored in a predetermined region of the non-volatile memory 50D or a storage device, such as the PC 2 and a terminal (not illustrated) on the network 4, and the like.

In step S108, the output authority of the display information file acquired in step S104 is acquired by referring to the file output authority table 80 stored in the RAM 50C. Further, it is determined whether or not a user represented by the user identification information received in step S100 is authorized to output the display information included in the display information file to the paper and the electronic paper 8. When the user is authorized to output the display information to both the mediums of the paper and electronic paper 8, step S110 is followed. If not, step S114 is followed. Herein, the description "authorized to output the display information to the paper and electronic paper 8" means that the identification ID which coincides with the user identification information is specified in each of the permission columns of the paper of the file output authority table 80 and the electronic paper 8.

For example, it is assumed that the user identification information received in step S100 is ID1 and the display information file represented as the content selection information is file 1. In this case, it is determined that the user represented by ID1 is authorized to output file 1 to the paper and the electronic paper 8 with reference to the contents of the file output authority table 80.

At step S110, data for displaying a screen, through which selection is made as to which one the display information is output to between the paper and the electronic paper 8, is transmitted to PC 2 which is the transmission source of the user identification information and the content selection information, through the network communication I/F 48. In addition, output destination information, which represents the output destination of the display information selected by PC 2, is acquired through the network communication I/F 48 to determine whether the output destination information is paper or the electronic paper 8. When the output destination information is paper, step S112 is followed and when the output destination information is the electronic paper 8, step S120 is followed.

At step S112, the paper supply unit 40 is controlled such that paper is supplied from the paper accommodation unit 28 to the image forming unit 14 and the image forming unit 14 is controlled such that the display information acquired in step S104 is formed on the paper by the above-mentioned electrophotographic method. Thereafter, the paper discharge unit 42 is controlled such that the paper formed with the display information is discharged to the outside of the image forming apparatus 10 and then the processing is finished.

At step S120, the display information file and the user identification information received in step S100 are transmitted to the electronic paper 8 through the electronic paper communication I/F 46 and the processing is finished.

Meanwhile, at step S114, it is determined whether or not the user represented by the user identification information received in step S100 is authorized to output the display information included in the display information file acquired in step S104 to the electronic paper 8. When the user is authorized to output the display information to the electronic paper 8, step S126 is followed. If not, step S116 is followed.

For example, it is assumed that the user identification information received in step S100 is ID1, the display information file represented as the content selection information is file 2, and the user represented by ID1 is permitted to use the image forming apparatus 10.

In this case, referring to the file output authority table 80, since ID1 is specified in the permission column of the electronic paper 8 corresponding to the file 2, it is determined that the user represented by ID1 is authorized to output the file 2 to the electronic paper 8 and the processing proceeds to step S126.

At Step S126, the processing similar to the above-mentioned step S120 is performed.

At step S116, first, it is determined whether or not the user represented by the user identification information received in step S100 is not authorized to output the display information included in the display information file acquired in step S104 to the electronic paper 8. When the user is not authorized to output the display information to the electronic paper 8, that is, when the identification ID which coincides with the user identification information of the user is specified in the inhibition column of the electronic paper 8 of the file output authority table 80 corresponding to the display information file, it is determined that the user is not authorized to output the display information included in the display information file to the electronic paper 8 and step S122 is followed.

Meanwhile, when the determination is a negative determination, that is, when the identification ID which coincides with the user identification information of the user is not specified in both the permission column and the inhibition column of the electronic paper 8 of the file output authority table 80 corresponding to the display information file, the authority to output the display information file set as the user to the electronic paper 8 is unclear.

In this case, in connection with the output of the display information file to the electronic paper 8, it is determined again whether or not the predetermined condition regarding the user based on a security viewpoint of preventing a leakage of information to a person other than the person concerned (authority-unclear condition) is satisfied. If the authority-unclear condition is satisfied, the user represented by the user identification information received in step S100 is authorized to output the display information file to the electronic paper.

As the authority-unclear condition, for example, a condition, which is predetermined based on organization information about an organization to which the user belongs, may be considered.

For example, whether the drafter of the display information file and a user who outputs the display information included in the display information file to the electronic paper 8 belong to the same organization such as a department or a section, or whether the user is a boss of the drafter of the display information file, or the like, is set as the authority-unclear condition.

For example, descriptions will be made assuming that the user identification information received in step S100 is ID1, the display information file represented as the content selection information is file 3, a person represented by the ID1 is permitted to use the image forming apparatus 10, and whether or not the drafter of the display information file and a user who outputs the display information included in the display information file to the electronic paper 8 belong to the same organization is set as the authority-unclear condition.

In this case, referring to the file output authority table 80, since ID1 is not specified in both the permission column and the inhibition column of the electronic paper 8 corresponding to file 3, it is determined that it is unclear whether the user represented by the ID1 is authorized to output file 3 to the electronic paper 8. For this reason, the drafter ID (ID3 in the present example) of file 3 is extracted from the file attribute table 82 and reference is made to an organization information table 84 illustrated in FIG. 11.

The organization information table 84 of FIG. 11 is a table in which a boss ID representing a belonging group and a boss of staff is set for each staff identified by the staff ID and is stored in, for example, a predetermined region of the non-volatile memory 50D in advance. Further, the organization information table 84 is stored in, for example, the PC 2, the content server 6 on the network 4, and thus may be acquired through the network communication I/F4 8.

The belonging group of staff represented by ID3 as the staff ID (in the present example, GROUP1) is extracted from the organization information table 84. Further, the belonging group of staff represented by ID1 (in the present example, GROUP1) is extracted from the organization information table 84. That is, both the drafter of file 3 and the user who outputs the file 3 to the electronic paper 8 are persons who belong to the same GROUP1, and therefore, the authority-unclear condition is satisfied, step S118 is followed.

For example, assuming that the user identification information received in step S100 is ID1, the display information file represented as the content selection information is file 3, and a person represented by ID1 is permitted to use the image forming apparatus 10, description will be made on a case in which whether a user who outputs the display information included in the display information file to the electronic paper 8 is a boss of the drafter of the display information file or not is set as the authority-unclear condition.

In this case, as described above, after it is determined that it is unclear whether the user represented by the ID1 is authorized to output the file 3 to the electronic paper 8 or not, the drafter ID of the file 3 (in the present example, ID3) is extracted from the file attribute table 82. Further, the boss ID of staff represented by the ID3 as the staff ID (in the present example, ID4) is extracted from the organization information table 84. That is, the user who outputs the file 3 to the electronic paper 8 is not the boss of the drafter of the file 3, and therefore, the authority-unclear condition is not satisfied. When the authority-unclear condition is not satisfied, step S122 is followed.

In addition to the condition predetermined based on the organization information on the organization to which the user belongs as illustrated above, a condition using user attribute information, such as whether or not the user who outputs the display information included in the display information file to the electronic paper 8 may be specified as an individual, may be used.

For example, when the user identification information received in step S100 is common user identification information for guests which is issued to temporarily permit a large indefinite number of outsiders to use the image forming apparatus 10 (for example, it is assumed as ID100), ID100 is assigned to a plurality of persons. Therefore, since it may not be specified who intends to output the display information included in the display information file to the electronic paper 8 based on the user identification information, it is determined that the authority-unclear condition is not satisfied.

In step S118, it is determined whether or not the user represented by the user identification information received in step S100 is authorized to output the display information included in the display information file acquired in step S104 to paper. When the user is authorized to output the display information to paper, step S110 as described above is followed so as to reception the selection as to whether the output destination of the display information is set to the paper or the electronic paper 8. If not, step S120 is followed.

For example, it is assumed that the user identification information received in step S100 is ID1, the display information file represented by the content selection information is file 4, the user represented by the ID1 is permitted to use the image forming apparatus 10, and the authority-unclear condition is satisfied.

In this case, referring to the file output authority table 80, since ID1 is specified in the permission column of paper corresponding to file 4, it is determined that the user represented by the ID1 is authorized to output the display information included in the file 4 to paper and thus, step S110 is followed.

Meanwhile, also at step S122, it is determined whether the user represented by the user identification information received in step S100 is authorized to output the display information included in the display information file acquired in step S104 to paper, as at step S118. When the user is authorized to output the display information to paper, step 124 is followed. If not, the display information is output to none of the paper and the electronic paper 8 and the processing is finished.

At step S124, the display information acquired in step S104 is formed on paper by performing the processing as in step S112 already described.

Although the image forming apparatus 10 according to the present exemplary embodiment of receives the content selection information from the PC 2 to acquire the display information file represented as the content selection information from the content server 6, the display information file may be adapted to be received from the PC 2. In this case, the processing of step S104 acquiring the display information file from the content server 6 becomes unnecessary.

In the present exemplary embodiment, although the user identification information and the content selection information is received from the PC 2, the user identification information may be adapted to be received by touching a contactless IC card (not illustrated), in which the user identification information is recorded, to the card reader 25 of the operation display unit 22. Further, the content selection information may be received by operating the display buttons of the display 24 or the hardware keys 26 of the operation display unit 22.

In this case, an unauthenticated user may be adapted to be temporarily authorized as an authenticated user, for example, by touching a contactless card (not illustrated) of the unauthenticated user to the card reader 25 with a contactless IC card (not illustrated) of the authenticated user stacked on the contactless IC card (not illustrated) of the unauthenticated user or by touching the contactless IC card (not illustrated) of the unauthenticated user to the card reader 25 and then touching the contactless IC card (not illustrated) of the authenticated user to the card reader 25 within a predetermined adjustable period.

From "temporarily" mentioned herein, it is not limited to a period until the output of desired display information to the recording medium or the electronic paper 8 is completed. For example, it may be a period until a predetermined time lapses after the unauthenticated user is authorized as the authenticated user or a period from the time and date when the unauthenticated user is authorized as the authenticated user to the predetermined time and date. Further, a positional limitation such as authorizing the unauthenticated user as an authenticated user later only by the image forming apparatus 10 which has authorized the unauthenticated user as an authenticated user is also included.

Next, an action of the electronic paper 8 which performs data communication with the image forming apparatus 10 through the image forming apparatus communication I/F 32 will be described.

Figure 12:
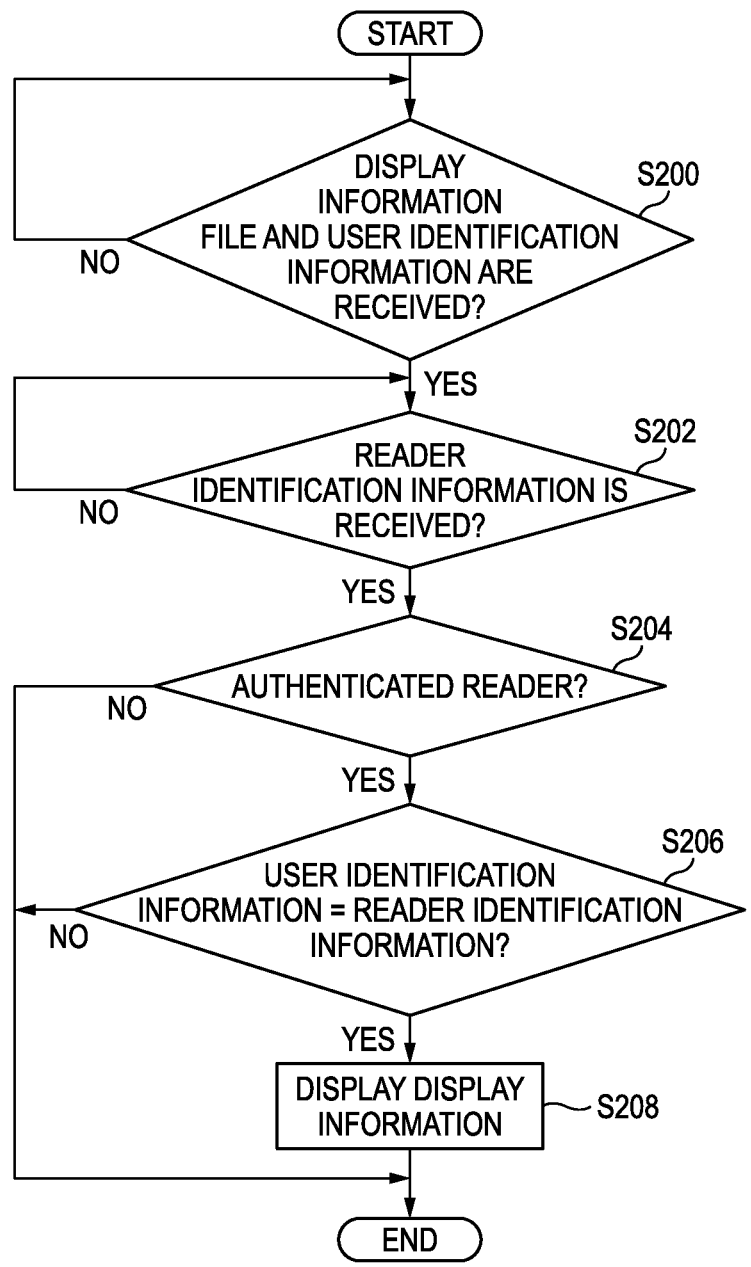
FIG. 12 is a flow chart of display processing executed by a computer of the electronic paper according to the present exemplary embodiment.

The processing illustrated in FIG. 12 is a flow chart which illustrates the processing flow of an electronic paper display program executed by the CPU 70A when the power of the electronic paper 8 is turned ON. The electronic paper display program is stored in a predetermined region of the ROM 70B in advance and is executed when the CPU 70A reads the electronic paper display program stored in advance. Further, for example, a type in which the electronic paper display program is recorded in a storage medium such as CD-ROM and is executed when it is read by, for example, a CD-ROM drive or a type in which the electronic paper display program is received and executed through a wired or wireless communication device, may be used.

First, at step S200, it is determined whether or not the display information file and the user identification information transmitted from the image forming apparatus 10 at step S120 of the display information output processing illustrated in FIG. 8 as described above are received through the image forming apparatus communication I/F 132.

When the display information file and the user identification information are received, each of the display information file and the user identification information is stored in, for example, a predetermined region of the RAM 70C to be associated with each other and step S202 is followed. If not, the processing of step S200 is continued until the display information file and the user identification information are received.

After the image forming apparatus 10 is connected to the electronic paper 8 in a wired manner and the display information file and the user identification information are stored in, for example, the RAM 70C, a reader of the electronic paper 8 (hereinafter, simply referred to as a "reader") may separate the wired line from the electronic paper 8 and convey the electronic paper 8 to any place.

Next, at step S202, it is determined whether the reader identification information is received from the card reader 134. When the reader identification information is received, step S204 is followed. If not, the processing of step S102 is continued until the reader identification information is received.

At step S204, it is determined whether a reader represented by the reader identification information received at step S202 is a person who is permitted to read the electronic paper 8 (an authorized reader) or a person who is not permitted to read the electronic paper 8 (unauthorized reader).

In this case, the authorization may be made by referring to a reader table in which the reader identification information of a person who is permitted to read the electronic paper 8 is described. The reader identification information is previously stored in, for example, the predetermined region of the non-volatile memory 70D. Further, the reader table may be previously stored in the hard disk 44 of the image forming apparatus 10, for example, and in such a case, may be acquired through the image forming apparatus communication I/F 132 and temporarily stored in the RAM 70C.

When the reader identification information is not described in the reader table, the reader is authorized as an unauthorized reader and the processing is finished. Meanwhile, when the reader identification information is described in the reader table, the reader is authorized as the authorized reader and step S206 is followed.

At step S206, it is determined whether the reader identification information of the authorized reader coincides with the user identification information stored in, for example, the RAM 70C at step S200. When the reader identification information coincides with the user identification information, step S208 is followed. If not, the processing is finished.

At step S208, the display information file corresponding to the user identification information which coincides with the reader identification information is read from the RAM 70C. Further, as described above, a display color for each pixel is acquired from the display information included in the display information file, the voltage applying unit 130 is controlled to apply a voltage according to the display color to each cell corresponding to each pixel, and the display information is displayed on the image display medium 110.

The display information displayed on the image display medium 110 may be adapted to be erased by controlling the voltage applying unit 130 after a predetermined time lapses, or by controlling the voltage applying unit 130 when an instruction to finish the reading is received from an operation unit (not illustrated) of the electronic paper 8.

The reader identification information is read from the card reader 134 at each predetermined timing and the display information is continuously displayed on the image display medium 110 during a period in which the reader identification information which coincides with the user identification information is detected. Otherwise, however, for example, when the reader identification information different from the user identification information is detected, for example, during that period, or when the reader identification information is not detected, the display information displayed on the image display medium 110 may be adapted to be erased.

Meanwhile, when the reader identification information of the authorized reader does not coincides with the user identification information stored in the RAM 70C, the voltage applying unit 130 is controlled so that the display information is not displayed on the image display medium 110 of the electronic paper 8.

Even in this case, for example, when a value representing a concealment degree of the display information is added to the display information file and the concealment degree of the display information is lower than the predetermined concealment degree, the display of the display information may be adapted to be controlled according to the attribute information of the display information, for example, by controlling the voltage applying unit 130 so as to display the display information on the image display medium 110 of the electronic paper 8.

Although the reader identification information according to the present exemplary embodiment is adapted to be detected by the card reader 134, the method of receiving the reader identification information is not limited thereto. For example, the reader identification information which is input by operating, for example, the hardware keys (not illustrated) of the electronic paper 8 and the buttons displayed on the touch panel type display may be received.

In this case, an unauthorized reader may be adapted to be temporarily authorized as an authorized reader by touching the contactless IC card of the unauthenticated user (not illustrated) to the card reader 134 with a contactless IC card of the authorized reader (not illustrated) stacked on the contactless IC card of the unauthenticated user, on the card reader 134 or by touching the contactless IC card of the unauthenticated user (not illustrated) to the card reader 134 and then touching the contactless IC card of the authenticated user (not illustrated) to the card reader 134 within a predetermined adjustable period.

From "temporarily" mentioned herein, it is not limited to a period until the reading of desired display information is completed. For example, it may be a period until a predetermined time lapses after the unauthorized reader is authorized as an authorized reader or a period from the time and date when the unauthorized reader is authorized as the authorized reader to the predetermined time and date. Further, a positional limitation such as authorizing the unauthenticated user as an authenticated user later only within a predetermined range by providing a position detection device in the electronic paper 8 is also included.

As described above, according to the present exemplary embodiment, the image forming apparatus 10 unitarily determines whether or not the display information is output to the outside of the image forming apparatus 10, based on the user identification information and the output authority information represented in the file output authority table 80, for example.

Even if it is unclear whether or not a user represented by the user identification information is authorized to output the display information on the display device such as the electronic paper 8, the image forming apparatus 10 outputs the display information to the display device when the predetermined condition about a user is satisfied.

The image forming apparatus 10 according to the present exemplary embodiment outputs the display information to any one of the display devices, such as paper and the electronic paper 8. However, the constituent components such as the image forming unit 14 is not essentially required depending on image formation on paper. The present exemplary embodiment describes the information processing apparatus by using the image forming apparatus 10. However, without being limited thereto for example, a personal computer may be used.

The display information may be output to an external storage medium, such as a hard disk and a memory disk, instead of being output to the display device. Even in this case, the display information output processing illustrated in FIG. 8 may be applied as it is.

The PC 2 according to the present exemplary embodiment is not limited to a personal computer and may be anything that outputs the user identification information and the content selection information to the image forming apparatus 10 through the network 4 based on an operation of a user. Specifically, a portable terminal such as a tablet terminal or a smart phone may be used as the PC 2.

The electronic paper 8 may be replaced by a display device which receives the display information from the image forming apparatus 10, has, for example, a log-in function to specify a reader who reads the display information and then display the display information. Specifically, the electronic paper 8 may use a portable terminal such as a note type personal computer, a tablet terminal, and a smart phone.

Although the present invention is described above with reference to the exemplary embodiments, the technical scope of the present invention is not limited to the scope described in the exemplary embodiments. Various changes or modifications may be applied to the exemplary embodiments without departing from the gist of the present invention and the changes or modifications are also included in the technical scope of the present invention.

A flow of the program processing described in the embodiments (FIGS. 8 and 12) is also an example, and therefore unnecessary steps may be deleted, new steps may be added, or the processing sequence may be changed, without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a reception unit configured to receive user identification information for identifying a user of the information processing apparatus which outputs display information to a display device which displays the display information, and the display information which is output to the display device; and
a transmission unit that, in a case where the user is permitted to use the information processing apparatus based on an authorization result of the user identification information received by the reception unit, is configured to transmit the user identification information and the display information to the display device when it is not known whether or not the user is authorized to output the display information received by the reception unit to the display device and when a predetermined condition about the user for outputting the display information to the display device is satisfied, wherein, in a case where the user is permitted to use the information processing apparatus based on the authorization result, the transmission unit is configured to transmit the user identification information and the display information to the display device when it is not known whether or not the user is authorized to output the display information received by the reception unit to the display device and a predetermined condition based on organization information about an organization to which the user belongs is satisfied.

2. The information processing apparatus according to claim 1, wherein, in a case where the user is permitted to use the information processing apparatus based on the authorization result, the transmission unit is configured to transmit the user identification information and the display information to the display device when it is not known whether or not the user is authorized to output the display information received by the reception unit to the display device and the organization to which the user belongs is the same as an organization to which a drafter of the display information belongs.

3. An information processing apparatus, comprising:
a reception unit configured to receive user identification information for identifying a user of the information processing apparatus which outputs display information to a display device which displays the display information, and the display information which is output to the display device; and
a transmission unit that, in a case where the user is permitted to use the information processing apparatus based on an authorization result of the user identification information received by the reception unit, is configured to transmit the user identification information and the display information to the display device when it is not known whether or not the user is authorized to output the display information received by the reception unit to the display device and when a predetermined condition about the user for outputting the display information to the display device is satisfied,
wherein the reception unit includes a detection unit configured to detect user identification information recorded in a recording medium, and
wherein when user identification information of the user who is permitted to use the information processing apparatus and user identification information of the user who is not permitted to use the information processing apparatus are detected by the detection unit, the user who is not permitted to use the information processing apparatus is authorized as a person who is permitted to use the information processing apparatus.

4. An information processing system, comprising:
an information processing apparatus including:
a reception unit configured to receive user identification information for identifying a user of the information processing apparatus which outputs display information to a display device which displays the display information, and the display information which is output to the display device;
a transmission unit that, in a case where the user is permitted to use the information processing apparatus based on an authorization result of the user identification information received by the reception unit, is configured to transmit the user identification information and the display information to the display device when it is not known whether or not the user is authorized to output the display information to the display device and when a predetermined condition about the user for outputting the display information to the display device is satisfied by the user identification information received by the reception unit; and
a display device including:
a reception unit configured to receive the user identification information for identifying the user of the information processing apparatus and the display information to be displayed on the display device, from the information processing apparatus;
a reader identification information reception unit comprising a card reader configured to receive reader identification information for identifying a reader of the display device;
an authentication unit configured to authenticate whether or not the reader represented by the reader identification information is permitted to use the display device; and
a display unit comprising an image display medium configured to display the display information when the user coincides with the reader,
wherein the display unit is configured to limit the display of the display information when the user does not coincide with the reader,
wherein the reader identification information reception unit includes a reader identification information detection unit configured to detect reader identification information recorded in a recording medium, and
wherein when reader identification information of the reader who is not permitted to use the display device and reader identification information of the reader who is permitted to use the display device are detected by the reader identification information detection unit, the reader who is not permitted to use the display device is authorized as a person who is permitted to use the display device.

5. The information processing system according to claim 4, wherein the display unit is configured to display the display information when the reader coincides with the user in a period where the reader identification information is detected by the reader identification information detection unit.

* * * * *